United States Patent [19]

Yoshiyuki et al.

[11] Patent Number: 4,588,939

[45] Date of Patent: May 13, 1986

[54] CHARGING SYSTEM FOR A CAR

[75] Inventors: Iwaki Yoshiyuki, Himeji; Matsumoto Akio; Yokota Mitsuyoshi, both of Hyogo, all of Japan

[73] Assignee: Mitsubishi Denki Kabushiki Kaisha, Tokyo, Japan

[21] Appl. No.: 576,387

[22] PCT Filed: Jun., 1983

[86] PCT No.: PCT/JP83/00179

§ 371 Date: Jan. 27, 1984

§ 102(e) Date: Jan. 27, 1984

[30] Foreign Application Priority Data

Jun. 3, 1982 [JP] Japan ............... 57-83721[U]

[51] Int. Cl.$^4$ .......................... H02J 7/14; H02P 9/10
[52] U.S. Cl. ......................................... 322/88; 320/6; 320/61; 320/64; 322/59
[58] Field of Search ............... 322/28, 59, 60, 86–88; 320/61, 64, 67, 68, 56, 6, 15

[56] References Cited

U.S. PATENT DOCUMENTS

| | | | |
|---|---|---|---|
| 1,118,269 | 11/1914 | Creveling | 320/61 X |
| 3,086,161 | 4/1963 | Decarbo et al. | 320/67 X |
| 3,246,232 | 4/1966 | Langston et al. | 322/60 |
| 3,444,946 | 5/1969 | Waterbury | 320/56 |
| 3,559,027 | 1/1971 | Arsem | 320/61 |
| 4,301,376 | 11/1981 | Ragaly | 322/88 X |

FOREIGN PATENT DOCUMENTS 1329552  9/1973  United Kingdom ............ 320/56

Primary Examiner—R. J. Hickey
Attorney, Agent, or Firm—Oblon, Fisher, Spivak, McClelland & Maier

[57] ABSTRACT

A surge voltage produced by intermittent operation of a voltage regulating device 5 is suppressed by providing a second power source 10 for exciting an alternating current generator.

3 Claims, 4 Drawing Figures

4,588,939

CHARGING SYSTEM FOR A CAR

CROSS REFERENCE TO CO-PENDING APPLICATIONS

Reference is made to co-pending applications having the same inventors as the present application, namely Ser. No. 576,388 filed 1-27-84 and Ser. No. 576,390 filed 1-27-84.

FIELD OF TECHNOLOGY

The present invention relates to a charging device for a car having a charging generator.

BACKGROUND OF TECHNOLOGY

FIG. 1 is a circuit diagram showing one example of the conventional charging device for a car. In the figure, the reference numeral 1 designates the armature coil of an alternating current generator mounted on a car and so on (not shown) to be actuated by an internal combustion engine (not shown); 2 designates a field coil provided near the armature coil 1; 3 designates a main rectifying devie for rectification of the armature coil; 4 designates an auxiliary rectifying device; 5 designates a voltage regulating device for controlling voltage between output terminals of the main rectifying device 3 to be a predetermined value by controlling a field current; 6 designates a battery; 7 designates a key-switch connected in a circuit comprising the battery 6, the field coil 2 and the voltage regulating device 5; 8 designates a pilot lamp placed in the vicinity of the key-switch 7 to indicate charging condition of the battery, one terminal of the pilot lamp being connected to the key-switch and the other being connected to the junction between the voltage regulating device 5 and the auxiliary rectifying device 4; and 9 designates an electrical load connected in parallel to the battery 6.

The operation of the conventional device constructed as above-mentioned will be described.

When the engine is in stopped condition, closing of the key-switch 7 flows an initial field current in a circuit of the battery 6→key-switch 7→a pilot lamp 8→field coil 2→voltage regulating device 5→battery 6 with the result that a field ampere-turn is produced in the field coil 2. At the same time, the pilot lamp 8 is lightened to indicate that the battery 6 is not in charging. Under the condition as above-mentioned, when the engine is started by a starting motor, a voltage is induced in the armature coil 1 since the armature coil is excited. When the rotating speed of the engine, that is, the alternating current generator reaches a predetermined value, the field current is supplied through the auxiliary rectifying device 4 and the voltage regulating device 5 whereby the alternating current generator acts as a self-excited generator. Namely, a circuit for field current of the auxiliary rectifying device 4→field coil 2→voltage regulating device 5→ground→main rectifying device 3→auxiliary rectifying device 4 is formed. Further, when the output voltage of the auxiliary rectifying device 4 reaches a predetermined level, the field current is interrupted by the voltage regulating device 5 with the result that the output voltage of the auxiliary rectifying device 4, namely the output voltage of the main rectifying device 3 is kept at a predetermined level. At the same time, the pilot lamp 8 is extinguished to indicate that the battery 6 is in charging.

However, in the conventional device above-mentioned in which a field current is supplied from the output of the generator, particularly of a control system in which a voltage is controlled to become a predetermined level by intermittence of the field current, there appears intermittence of the load in the output of the generator for an amount corresponding to the field current whereby a high surge voltage is produced across output terminals of the rectifier as shown in FIG. 2 when the field current is interrupted, namely the voltage regulating device 5 is actuated. Occurrence of the surge voltage became a principal cause of noise. In FIG. 2, the symbol B designates surge voltage at the time of commutation in the generator.

SUMMARY OF THE INVENTION

According to the present invention, variation of a surge voltage caused by intermittent actuation of a voltage regulating device is suppressed by providing a power source for exciting an alternating current generator independent of a battery and supplying a field current to a field coil through the power source for excitation whereby occurrence of noise is effectively reduced.

PREFERRED EMBODIMENT OF THE INVENTION

Figure 3:
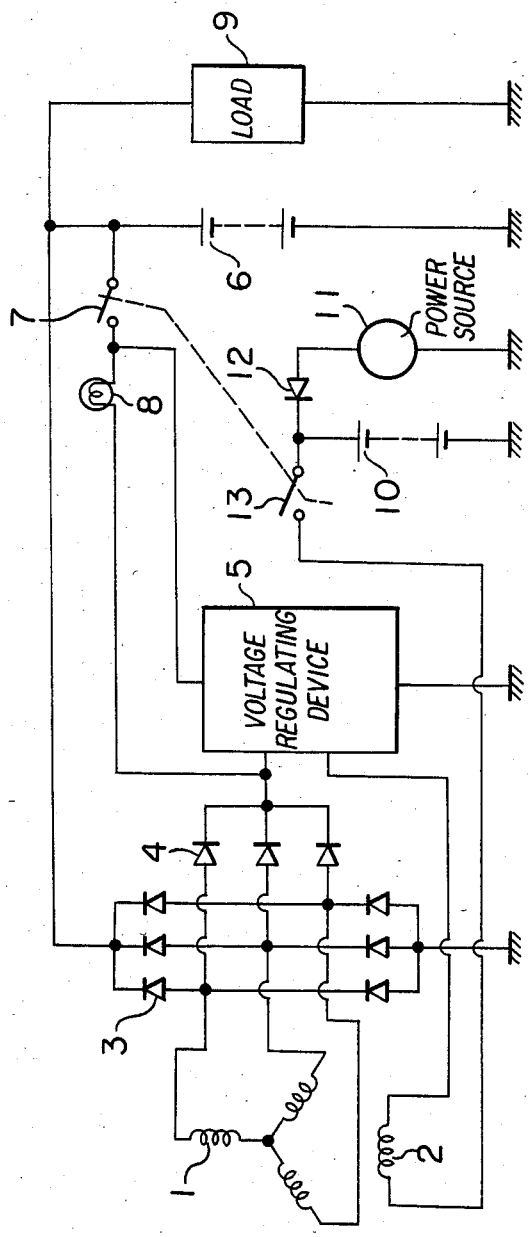
FIG. 3 is a circuit diagram of an embodiment of the present invention.

FIG. 3 is a circuit diagram of an embodiment of the charging device for a car according to the present invention.

In FIG. 3, the reference numeral 10 designates a second battery as a power source for exciting an alternating current generator (not shown) and the positive side is connected in series to the voltage regulating device 5 above-mentioned through the field coil 2. 11 designates a power source such as a solar battery, a thermo-electric conversion element and so on which is used to charge the second battery; 12 designates a reverse current blocking diode whose anode is connected to the power source and whose cathode is connected to the positive side of the second battery 10. 13 designates a second key-switch which opens and closes in synchronism with the key-switch 7 and which is connected between the field coil 2 and the junction of the battery and the reverse current blocking diode 12.

The operation of the embodiment of the present invention having the construction above-mentioned will be described.

First of all, when the key-switch 7 and the second key-switch 13 are simultaneously closed under non-operating condition of the engine, a closed circuit of the battery 6→key-switch 7→pilot lamp 8→voltage regulating device 5→battery 6 is formed and the pilot lamp 8 is lightened by conductive current to indicate that the battery 6 is not in charging.

Figure 1:
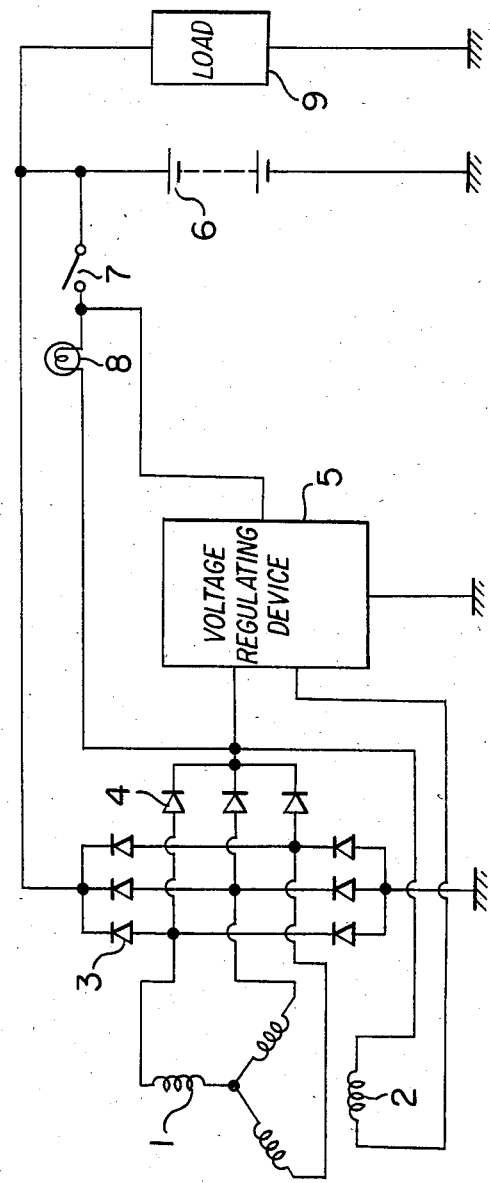
FIG. 1 is a circuit for the conventional charging device for a car.
Figure 2:
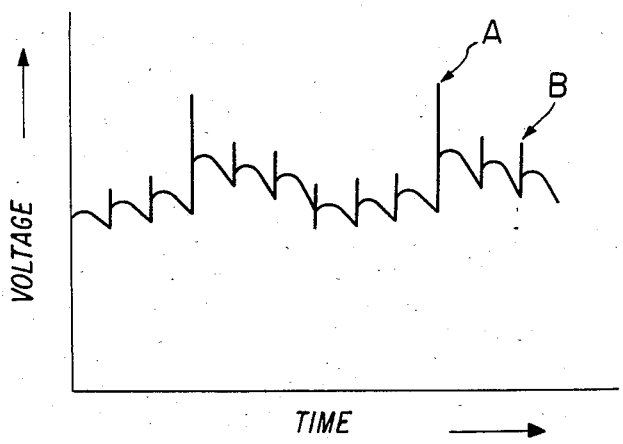
FIG. 2 is a diagram showing the waveform of a surge voltage in the conventional device.
Figure 4:
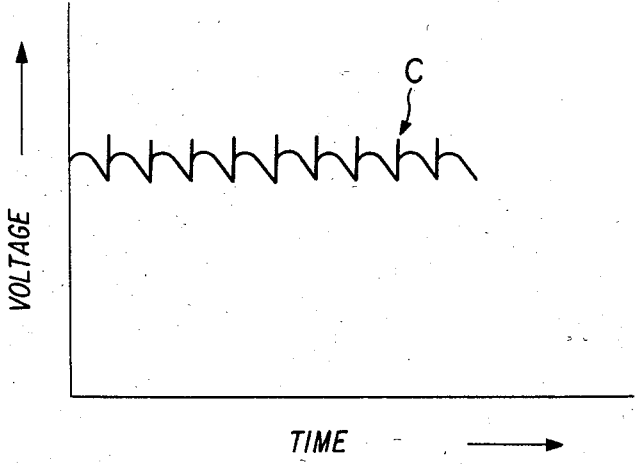
FIG. 4 is a diagram similar to FIG. 2 of an embodiment of the present invention.

Simultaneously, a closed circuit of the second battery 10→second key-switch 13→field coil 2→voltage regulating device 5→second battery 10 is formed by the second battery 10 which has been charged by the power source 11 through the diode 12 whereby a field current flows in the field coil 2 to cause a field ampere-turn. Under the condition as above-mentioned, when the engine is started by a starting motor (not shown), voltage is induced in the armature coil 1. When the voltage reaches a predetermined level, the electric current to the pilot lamp 8 is stopped and the pilot lamp 8 is extinguished to indicate that the battery 6 is in charging. Further, when the output voltage of the voltage regulating device 5 reaches a predetermined level, the field current is interrupted by the voltage regulating device 5 and the output voltage of the auxiliary rectifying device 4, namely the output voltage of the main rectifying device 3 is kept at a predetermined level. Thus, intermittence of the field current to render an output voltage to be a predetermined level does not cause change in the load of the generator since the field current is supplied through the second battery 10 as described above. Therefore, the surge voltage C is not resulted even at the time of interruption of field current as found in the surge voltage waveform of FIG. 4.

In the embodiment as above-mentioned, description has been made as to the second battery being charged by the solar battery and so on. The same effect as in the embodiment can, however, be attained by using a generator for excitation instead of the solar battery.

INDUSTRIAL UTILITY

The present invention is applicable not only to an alternating current generator for a vehicle but also to a car such as farm tractor, an industrial vehicle and so on.

We claim:

1. A charging system for a car which suppresses surge voltages in the output, comprising:

A generator having an armature coil for producing an alternating output and a field coil facing said armature coil;

a rectifying device for rectifying said alternating output to produce a rectified output voltage;

a voltage regulating device for controlling said rectified output voltage by controlling the field current in said field coil;

a battery charged with the rectified output from said generator;

a first switch for connecting said voltage regulating device and said battery;

a power source independent of said battery and independent of said rectified output voltage, connected to one side of said field coil for supplying the entire field current to said field coil; and a second switch mechanically connected to said first switch so as to be operated concurrently therewith, said second switch connecting said power source to said field coil;

wherein the operation of said voltage regulating device does not produce a surge voltage in said rectified output.

2. The charging system for a car according to claim 1, wherien said power source includes a second battery and a solar battery and said second battery is charged by said solar battery.

3. The charging system for a car according to claim 1, wherein said power source includes a second battery and a thermo-electric conversion element and said second battery is charged by said thermo-electric conversion element.

* * * * *